Figure 1:
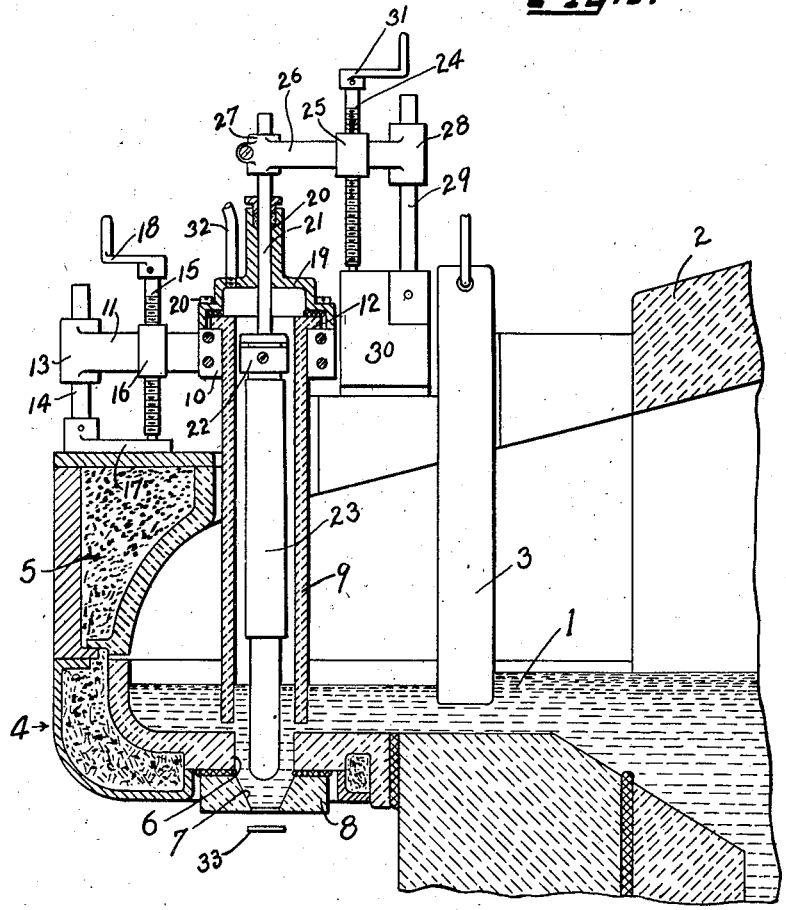

Oct. 15, 1929.  K. E. PEILER  1,731,681

METHOD OF AND APPARATUS FOR FEEDING MOLTEN GLASS

Filed June 7, 1927   2 Sheets-Sheet 1

Witness:
J. J. White

Inventor
Karl E. Peiler
by Robert A. Brown
Attorney

Oct. 15, 1929.  K. E. PEILER  1,731,681
METHOD OF AND APPARATUS FOR FEEDING MOLTEN GLASS
Filed June 7, 1927  2 Sheets-Sheet 2

Witness:
J. G. White

Inventor:
Karl E. Peiler
by Robert A. Brown
Attorney

Patented Oct. 15, 1929

1,731,681

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

METHOD OF AND APPARATUS FOR FEEDING MOLTEN GLASS

Application filed June 7, 1927. Serial No. 197,159.

This invention relates to methods and apparatus for discharging molten glass from a submerged outlet in a series of successively suspended masses and for separating mold charges from such masses for delivery to an associated glassware forming or fabricating machine.

It is well known in the glass working art that molten glass on issuing from an outlet of a container and exposed to the colder surroundings outside the container acquires a surface or skin commonly known in the art as "enamel". When a charge of molten glass is delivered to a mold, any undue stretching of its enamel will cause defects in the article of glassware that is formed of such mold charge. Any trapping of air by the glass due to the lapping or folding of the surface of the glass charge as it is delivered to a mold will also cause defects. It, therefore, is of particular advantage in order to obviate such defects in the glassware that is produced that the mold charges for making such glassware shall be preformed to closely fit the portions of the molds in which they are to be received. This is of special importance in the making of blown glassware.

An object of the present invention is the provision of a method and apparatus whereby feeding of molten glass through an outlet and the preliminary shaping of mold charges of the molten glass while in suspension to fit the molds in which they are to be received can be regulated and controlled to vary with relatively great ease, exactness and nicety within relatively wide ranges the sizes and shapes that such charges will have when separated from their parent masses of glass for delivery to the molds and so that mold charges of uniform size, shape and condition will be produced while the conditions governing the feeding, shaping and separation of such charges from their parent masses of glass remain unchanged.

A further object of the invention is the provision of a glass feeding apparatus of the character described which is susceptible of convenient and easy adjustment during its operation to vary within a relatively wide range the size and shape of the mold charges that will be produced by the feeding apparatus for delivery to a glassware fabricating machine.

The present invention accomplishes the preliminary shaping of the portions of masses of glass suspended from an outlet which, when severed from their source of supply, will serve as mold charges by the cooperation with a submerged discharge outlet of adjustable rigid flow regulating means depending in the glass toward the outlet, the cooperation with the outlet and with the flow regulating means of severing means acting periodically below the outlet, and the cooperation with all of the aforesaid shape controlling means of alternating pressures above and below the normal atmospheric pressure acting on the glass above and in the outlet and within the confines of the flow regulating means in timed relation to the operations of the severing means.

The present invention also may vary the preliminary shape that will be given to the mold charges while in suspension and before separation from their parent masses of glass by varying the head of glass in the glass container and by periodically reciprocating all or part of the flow regulating means in adhesive contact with the glass above the outlet in timed relation with the severing operations to effect periodic accelerating and retarding impulses on the glass in the outlet. In addition, the present invention makes use of the tendency of a mass of glass suspended from above to elongate by gravity to control the shape of the portion of the mass that is to form a mold charge. Also, my invention provides flow regulating means comprising essentially two concentric parts extending into the glass above the outlet and adjustable vertically or reciprocable vertically as a unit or independently to vary the preliminary shape that will be given to the mass of glass in suspension below the outlet. The inner member of the flow regulating means may be adjusted to depend into the outlet and to aid by reason of the adhesion of part of the suspended mass of glass thereto to support such suspended mass below the outlet and to aid in effecting the preliminary shaping of the portion of such mass that is to serve as a mold charge.

Various adjustments of the rigid flow regulating or impelling means, of the severing means, and of the means for causing periodic alternating pressures above and below atmospheric pressure on the glass above and in the outlet may be made during the operation of the feeding apparatus to vary as desired the preliminary shaping of the mold charge masses in suspension, thus not only affording desirable ranges of sizes and shapes of the mold charge masses, but also assuring the maintenance of the flow of glass and of uniform heat conditions which are essential to proper and efficient operation of glass feeding apparatus.

The invention also contemplates the provision of a removable outlet ring for controlling the cross-sectional area of a mass of glass issuing from the outlet so that such cross-sectional area and the general preliminary shape of the mold charge mass to be suspended from the outlet may be varied by selective use of a plurality of outlet rings of different sizes.

Figure 2:
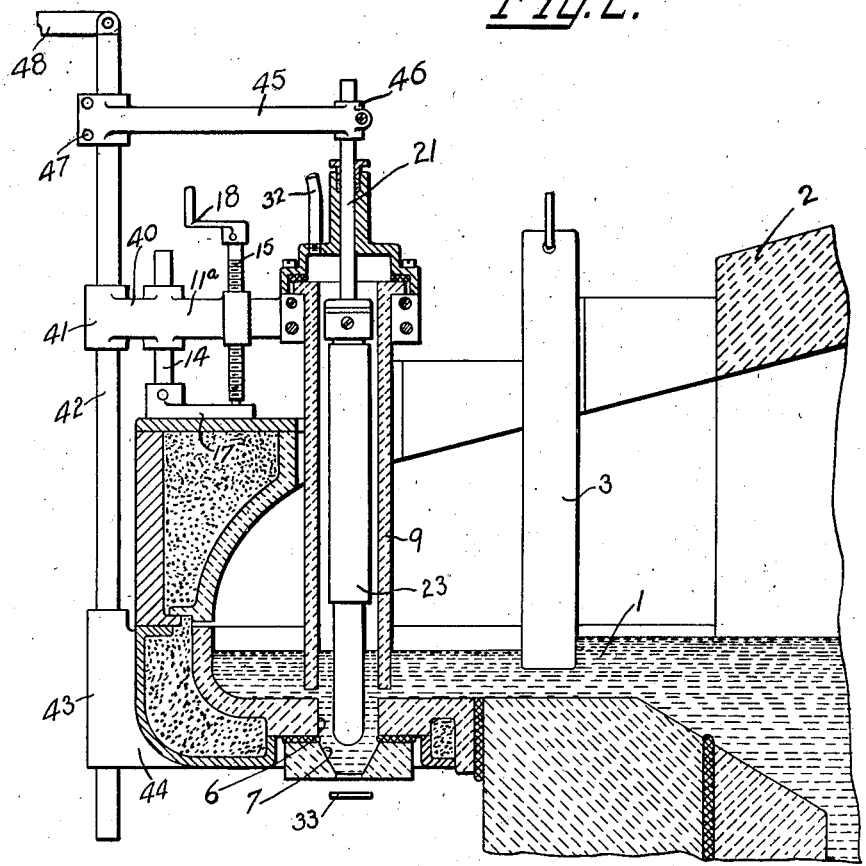

In the accompanying drawings:

Fig. 1 is a view partly in side elevation and partly in longitudinal vertical section of a glass feeding apparatus embodying the invention shown appurtenant to a melting furnace, only a portion of the latter being illustrated; and Fig. 2 is a view similar to Fig. 1, showing a slightly modified form of glass feeding apparatus.

Referring to the drawings, molten glass 1 may flow from a glass furnace 2 underneath a vertically adjustable gate 3 into a forehearth or container 4. The forehearth 4 may have its walls insulated with heat insulating material, as at 5, and is provided adjacent to its outer end with a submerged discharge outlet, which may consist partly of an aperture 6 in the bottom of the forehearth and partly of the downwardly tapering central opening or bore 7 of a removable outlet ring 8. The outlet of the forehearth is always submerged in the molten glass and the rate of normal gravity flow from the forehearth through the outlet is controlled by flow regulating means which will now be described. Such flow regulating means comprises a tube or bell 9 of suitable refractory material depending through an opening in the top of the forehearth in line with the outlet. A clamp 10 at one end of a bracket arm 11 embraces the tube 9 underneath a flange 12 at the upper end of the tube. The bracket arm 11 is provided at its outer end with a vertically apertured boss 13 sliding on a vertical guide rod 14 which projects upwardly from the top of the forehearth, whereby the tube 9 will be maintained vertical and in substantial axial alignment with the outlet during vertical movements of the tube 9. The tube 9 may be adjusted vertically in respect to the outlet and supported in adjusted position by means of an adjusting screw 15 which is threaded through the vertically apertured middle portion 16 of the bracket arm 11 and bears at its lower end against a bearing plate 17 on the top of the forehearth. The adjusting screw 15 may be provided with a crank handle 18 for convenient manipulation thereof.

A cap 19 is secured, as by screws 20, to the flanged upper end of the tube 9 and has its crown provided with a central stuffing box 20' through which a rod 21 slidably extends. This rod 21 has a chuck or holder 22 at its lower end for supporting a refractory flow regulating core or plunger 23 which depends through the tube 9 in spaced concentric relation with the latter and in axial alignment with the outlet. The lower end of the member 23 depends in the glass below the level of the lower end of the tube 9 and may depend into or even through the outlet, without completely obstructing the outlet.

The member 23 may be adjusted vertically in the tube 9 by the operation of an adjusting screw 24 which is threaded through the vertically apertured middle portion 25 of a bracket arm 26 having a clamp 27 at one end embracing the rod 21 and having a vertically apertured boss 28 at its other end slidable on a guide rod 29 that is carried by a supporting block 30 on the forehearth, the lower end of the adjusting screw 24 bearing on said block 30 and being provided at its upper end with a crank handle 31, whereby it may be conveniently manipulated. It will be obvious that the bracket arm 26, the adjusting screw 24 and the guide rod 29, or equivalent parts may be suitably arranged so that the adjusting screw 24 and the guide rod 29 will be carried by the bracket arm 11 so that adjustment of the tube 9 vertically would also cause vertical adjustment of the member 23, while the member 23 could be adjusted vertically independently of the tube 9 when desired. It also will be obvious that suitable connections may be made between the tube 9 and the rod 21 and a source of oscillatory motion, such as is embodied in my prior co-pending application for apparatus for feeding molten glass, Serial No. 683,576, filed Dec. 31, 1923, for reciprocating members 9 and 23 vertically as a unit or independently of each other or for reciprocating either of such members.

A flexible tubular conduit 32 is connected at one end with the crown of the cap 19 and is adapted for connection with any suitable mechanism, not shown, for causing variations in fluid pressures within the tube 9 and therefore on the glass above and in the outlet. A suitable mechanism for causing such variations in pressure above and below normal atmospheric pressure is disclosed in Patent No. 1,405,936, granted to me February 7, 1922.

Shear blades, as at 33 and such as are shown in the aforesaid patent, are adapted to close periodically below the outlet to sever mold charges from the masses discharged through and suspended from the outlet. The invention contemplates the use of a suitable mechanism, not shown, such as that disclosed in Patent 1,405,936 for operating the shear blades in timed relation with the impulses that will be given to the glass within the tube 9 above the outlet by the periodically recurring variations in fluid pressure on said glass, and it is intended that the timed relation between the operations of the severing blades and such periodic impulses on the glass, the character of the severing operations, and the amounts, durations and effects of the fluid pressure may be varied to produce the different effects on the glass issuing through and suspended from the outlet, as disclosed in Patent 1,405,936.

The operation of the apparatus that has been described so far is substantially as follows:

The gate 3 is adjusted vertically to maintain a desired head of glass around the tube 9. The tube 9 is adjusted vertically to regulate the flow of glass between the lower end of the tube 9 and the bottom of the forehearth into the lower end of the tube 9 and the outlet. The core member 23 is adjusted vertically to regulate the gravity flow through the outlet and also to aid in supporting from above the mass of glass that has issued through the outlet. The outlet ring is selected to determine the general shape and cross-sectional area of the body of the mold charge mass. The glass issuing through the outlet will accumulate and be suspended in successive masses from which mold charges will be severed periodically by the shears 33. The effects of the fluid pressure on the glass within the lower end of the tube 9 and in the outlet on the size and shape of the mold charge masses suspended below the outlet may be varied by adjusting the tube 9 and the core member 23 or either the tube 9 or the core member 23 vertically in respect to the outlet, by adjusting the operations of the mechanism for causing variations of the fluid pressure on the glass, by varying the size of the outlet ring, by varying the timed relation between the operations of the shears and the retarding or retracting and expelling impulses given to the glass by sub-atmospheric and super-atmospheric pressures, by varying the speed of cutting of the shears, by varying the plane in respect to the outlet at which the shears will cut through the suspended masses of glass, or by any or all of said adjustments and variations. It, therefore, will be obvious that the size and shape of the mold charges which will be periodically severed from successive masses of glass depending from the outlet may be regulated within a relatively wide range with relatively great ease, nicety and exactness so that the mold charges when severed from their source of supply will be of the required shape and size to nicely fit within the molds for which they are intended without any appreciable distortion. Practically perfect glassware thus may be formed of such mold charges by blowing, pressing or other known shaping operations.

The form of apparatus illustrated in Fig. 2 has an arm 11ª supporting the tube 9 and generally similar to the arm 11, but different from the latter in that it is provided at its outer end with an extension 40 having a vertically apertured portion 41 through which a vertical slide rod 42 extends. The slide rod 42 also extends slidably through a vertical bearing 43 on a supporting member 44, which may be joined integrally or otherwise to the forehearth. An arm 45, which replaces the arm 26 of the apparatus shown in Fig. 1, has a clamp 46 at one end secured to the plunger rod 21 and a clamp 47 at its opposite end secured to the slide rod 42. The slide rod 42, the arm 45 and the plunger stem 21 and plunger 23 may be reciprocated vertically to aid in controlling the periodic discharge of glass through the outlet, the suspension of the issued glass in successive masses below the outlet and the shaping of the suspended mold charge masses, thus permitting further regulation of the shape and size of mold charges which may be obtained periodically by the use of apparatus embodying the invention. If desired, the member 41 may be formed to serve as a clamp for connecting the arm 11ª with the slide rod so that the tube 9 will be reciprocated in unison with the rod 42 and plunger 23. The mechanism for reciprocating the rod 42 and the parts carried thereby should be adjustable or controllable in any known manner so that such parts may remain stationary for any desired length of time during the operation of the feeder, and so that the accelerating and retarding impulses imparted to the glass by the reciprocation of the plunger or of both the tube and plunger may occur in synchronism and in any desirable time relation with the pneumatic expelling and retarding or retracting impulses on the glass. The screw 15 may be manipulated to cooperate with the plate 17 to adjust the tube 9 vertically or to vary the lowest position of the tube 9 when the tube is reciprocated and the plunger 23 may be adjusted vertically independently of the tube 9 by adjusting the clamp 47 along the guide rod 42 or by adjusting the rod 21 vertically in the clamp 46.

I claim:

1. In glass feeding, the method of suspending and shaping a mass of molten glass issuing from a submerged outlet of a container, which comprises regulating normal gravity flow of glass to the outlet and sequestering part of the glass within the container above the outlet, periodically causing expelling and retarding fluid pressure impulses on the sequestered glass to accelerate and retard gravity flow through the outlet to aid in suspending and shaping the glass issuing from the outlet, and further aiding in suspending and shaping the issued glass by disposing a rigid implement in position to extend through the sequestered glass into the outlet without completely obstructing the outlet.

2. In glass feeding, the method of suspending and shaping a mass of molten glass issuing from a submerged outlet of a container, which comprises regulating normal gravity flow of glass to the outlet and sequestering part of the glass within the container above the outlet, causing a variable fluid pressure on the sequestered glass, and regulating flow of glass through the outlet and aiding in suspending and shaping the issued glass by a rigid flow regulating and supporting member extending through the sequestered glass into the outlet without completely obstructing the outlet.

3. In glass feeding, the method of suspending and shaping a mass of molten glass issuing from a submerged outlet of a container, which comprises regulating normal gravity flow of glass to the outlet and sequestering part of the glass within the container above the outlet, periodically accelerating and retarding the flow of glass through the outlet by alternately increasing and decreasing the fluid pressure on the sequestered glass above and below a fluid pressure on the remainder of the glass within the container, and further aiding in suspending and shaping the issued glass by supporting the issued glass from above substantially at its axis by a rigid implement extending through the sequestered glass.

4. In glass feeding, the method of suspending and shaping a mass of molten glass issuing from a submerged outlet of a container, which comprises regulating normal gravity flow of glass to the outlet and sequestering part of the glass within the container above the outlet, varying the relative fluid pressures on the sequestered glass and the remainder of the glass within the container to further regulate flow through the outlet and to aid in suspending and shaping the issued glass, and further aiding in suspending and shaping the issued glass by disposing a rigid implement in position to depend through the sequestered glass into the outlet without completely obstructing the outlet.

5. The method of feeding molten glass in mold charges, which comprises sequestering part of the glass within the container above a submerged outlet of the container, periodically accelerating and retarding flow of glass through the outlet to aid in suspending and shaping the issued glass below the outlet by alternately raising and lowering the pressure on the surface of the sequestered glass above and below normal atmospheric pressure, variably restricting the flow of glass through the outlet and aiding in supporting from above the glass issuing from the outlet by an implement depending through the sequestered glass into the outlet, and severing mold charges from successive masses of issued glass in timed relation to the application of accelerating impulses on sequestered glass.

6. The method of feeding molten glass in mold charges, which comprises flowing glass by gravity downwardly through a submerged outlet of a glass container, periodically accelerating and retarding flow of glass through the outlet by reciprocating an implement in adhesive contact with the glass substantially in line with the outlet, further accelerating and retarding flow of glass through the outlet by imparting expelling and retarding fluid impulses to the glass above the outlet and surrounding said implement in timed relation to the accelerating and retarding strokes of the implement, and periodically severing mold charges from successive masses of issued glass while such masses are suspended from the outlet.

7. The method of feeding molten glass in mold charges, which comprises flowing glass by gravity downwardly through a submerged outlet of a glass container, periodically accelerating and retarding flow of glass through the outlet by reciprocating an implement in adhesive contact with the glass substantially in line with the outlet, further accelerating and retarding flow of glass through the outlet by imparting expelling and retarding fluid impulses to the glass surrounding said implement above the outlet in timed relation to the accelerating and retarding strokes of the implement, and periodically severing mold charges from successive masses of issued glass in timed relation to the application of the expelling fluid impulses and while such masses are suspended below the outlet.

8. The method of feeding molten glass in mold charges, which comprises flowing glass by gravity downwardly through a submerged outlet of a glass container, periodically accelerating and retarding flow of glass through the outlet by reciprocating an implement in adhesive contact with the glass substantially in line with the outlet, further accelerating and retarding flow of glass through the outlet by imparting expelling and retarding fluid impulses to the glass surrounding said implement above the outlet in timed relation to the accelerating and retarding strokes of the implement, and severing mold charges from said suspended masses while such masses are suspended below the outlet and in timed relation to the application of the fluid expelling impulses.

9. The method of feeding molten glass in mold charges, which comprises flowing glass by gravity through a discharge outlet of a container, periodically accelerating flow of glass through the outlet by an implement in adhesive contact with the glass and a pneumatic pressure acting on the glass surrounding the implement, and periodically severing mold charges from the issued glass in timed relation to the periods of accelerated flow through the outlet.

10. The method of feeding molten glass in mold charges, which comprises flowing glass by gravity through a discharge outlet of a container, periodically accelerating and retarding flow of glass through the outlet by an implement in adhesive contact with the glass, further accelerating and retarding flow through the outlet by periodic positive and negative air pressures on the glass surrounding the implement above the outlet, and periodically severing mold charges from the issued glass.

11. Apparatus for feeding molten glass, comprising a container having a submerged outlet, a tubular member depending in the glass substantially in line with the outlet, a solid implement located within the tubular member and depending into the submerged outlet without completely obstructing the outlet, said solid implement and said tube cooperating to form a space between the tube and the solid implement, and means whereby the fluid pressure on the glass in said space in the tube may be varied.

12. Apparatus for feeding molten glass, comprising a container having a submerged outlet, a tubular member depending in the glass substantially in line with the outlet, a solid implement located within the tubular member and depending into the submerged outlet without completely obstructing the outlet, said solid implement and said tube cooperating to form a space between the tube and the solid implement, and means whereby the air pressure on the glass in said space within the tube can be periodically raised and lowered above and below the normal atmospheric pressure to periodically accelerate and retard flow of glass through the outlet, and means for severing mold charges from the issued glass below the outlet in timed relation to the periodic acceleration of flow through the outlet.

13. In apparatus for feeding molten glass in mold charges, a glass container having a submerged outlet, a tubular member depending in the glass substantially in line with the outlet, means for adjusting vertically the position of the lower end of said tubular member in respect to the outlet, a core member extending in the tubular member in spaced relation to the latter adapted to depend into the outlet without completely obstructing the outlet, means for adjusting said core member vertically in respect to the outlet, and a fluid conducting tube discharging into the space between said first named tube and said core member and adapted for connection with a source of fluid pressure impulses.

14. In apparatus for feeding molten glass in mold charges, a glass container having a submerged outlet, an implement depending into said outlet for regulating the flow through the outlet, and means surrounding said implement for regulating flow from the body of glass in the container to the outlet and for sequestering part of the glass in the container above the outlet, means whereby positive and negative fluid pressure impulses may be periodically applied to said sequestered mass of glass to periodically accelerate and retard flow of glass through the outlet, and means for severing mold charges from the issued glass in timed relation to the periodic accelerating impulses on the glass.

15. In apparatus for feeding molten glass in mold charges, a glass container having a submerged outlet, an implement depending into said outlet for regulating flow through the outlet, means surrounding said implement for regulating flow from the body of glass in the container to the outlet and for sequestering part of the glass in the container above the outlet, means whereby positive and negative fluid pressure impulses may be periodically applied to said sequestered mass of glass to periodically accelerate and retard flow of glass through the outlet, means for adjusting said glass sequestering means vertically, and means for adjusting said flow regulating implement vertically.

16. In glass feeding apparatus, a glass container having a submerged outlet, a vertically adjustable tube depending in the glass toward the outlet, a plunger depending through said tube and adapted to enter said outlet without completely obstructing the outlet, said plunger being spaced from said tube, means for reciprocating said plunger, a fluid conducting tube arranged to discharge into the space between said plunger and tube and adapted for connection with a source of alternating positive and negative fluid pressures, and means for severing mold charges periodically from the glass issuing through the outlet.

17. Apparatus for feeding mold charges of a predetermined size and shape from the discharge outlet of a container, comprising a pneumatic tube projecting into the glass above the outlet and in axial alignment therewith, a core member located within the tube and projecting into the discharge outlet to form a flow resisting passage for the glass, means for transmitting pulsations to the glass in the tube, means for reciprocating the core toward and from the outlet in synchronism with the pulsations, and means for severing mold charges periodically from the issued glass.

18. Apparatus for feeding mold charges of a predetermined size and shape from a molten glass supply in a container having a submerged discharge outlet, comprising a pneumatic tube projecting into the glass above the outlet, a core member positioned within the tube and adapted to form an annular flow resisting passage for the glass in the outlet, means for adjusting the core to vary the resistance to flow of the glass through the outlet, means for transmitting pulsations to the glass in the tube, means for reciprocating the core within the outlet, and a gate for regulating the glass level in the container.

19. Apparatus for feeding molten glass comprising a container having a submerged outlet, a tubular member depending in the glass substantially in line with the outlet, a rigid implement located within the tubular member and depending into the submerged outlet without completely obstructing the outlet, and means independent of said rigid implement for causing periodic expelling and retarding impulses on the glass in said tube.

20. The method of feeding molten glass in mold charges, which comprises flowing glass by gravity through a discharge outlet of a container, periodically retarding flow of glass through the outlet by an implement in adhesive contact with the glass and by a fluid pressure acting on the glass surrounding the implement, and periodically severing mold charges from the issued glass in timed relation to the periods of retarded flow through the outlet.

Signed at Hartford, Conn., this 1st day of June, 1927.

KARL E. PEILER.